(No Model.) 2 Sheets—Sheet 1.
F. B. MANVILLE.
MACHINE FOR TURNING KEYS FOR GAS COCKS.

No. 451,184. Patented Apr. 28, 1891.

WITNESSES
C. M. Newman
Arley J. Munson

INVENTOR
Frank B. Manville
By H. M. Wooster
Atty.

(No Model.) 2 Sheets—Sheet 2.

F. B. MANVILLE.
MACHINE FOR TURNING KEYS FOR GAS COCKS.

No. 451,184. Patented Apr. 28, 1891.

WITNESSES
C. M. Newman,
Arley F. Munson.

INVENTOR
Frank B. Manville
By H. M. Wooster
Atty.

THE NORRIS PETERS CO., PHOTO-LITHO., WASHINGTON, D. C.

UNITED STATES PATENT OFFICE.

FRANK B. MANVILLE, OF WATERBURY, CONNECTICUT, ASSIGNOR TO BLAKE & JOHNSON, OF SAME PLACE.

MACHINE FOR TURNING KEYS FOR GAS-COCKS.

SPECIFICATION forming part of Letters Patent No. 451,184, dated April 28, 1891.

Application filed October 9, 1890. Serial No. 367,485. (No model.)

*To all whom it may concern:*

Be it known that I, FRANK B. MANVILLE, a citizen of the United States, residing at Waterbury, in the county of New Haven and State of Connecticut, have invented certain new and useful Improvements in Machines for Turning Keys and Similar Articles; and I do hereby declare the following to be a full, clear, and exact description of the invention, such as will enable others skilled in the art to which it appertains to make and use the same.

My invention has for its object to produce an automatic machine for turning keys and similar metallic articles, the machine being adjustable to receive different-sized articles, which may be either straight or tapering.

With this end in view I have devised the simple and novel machine of which the following description, in connection with the accompanying drawings, is a specification, numerals being used to denote the several parts.

Figure 1:
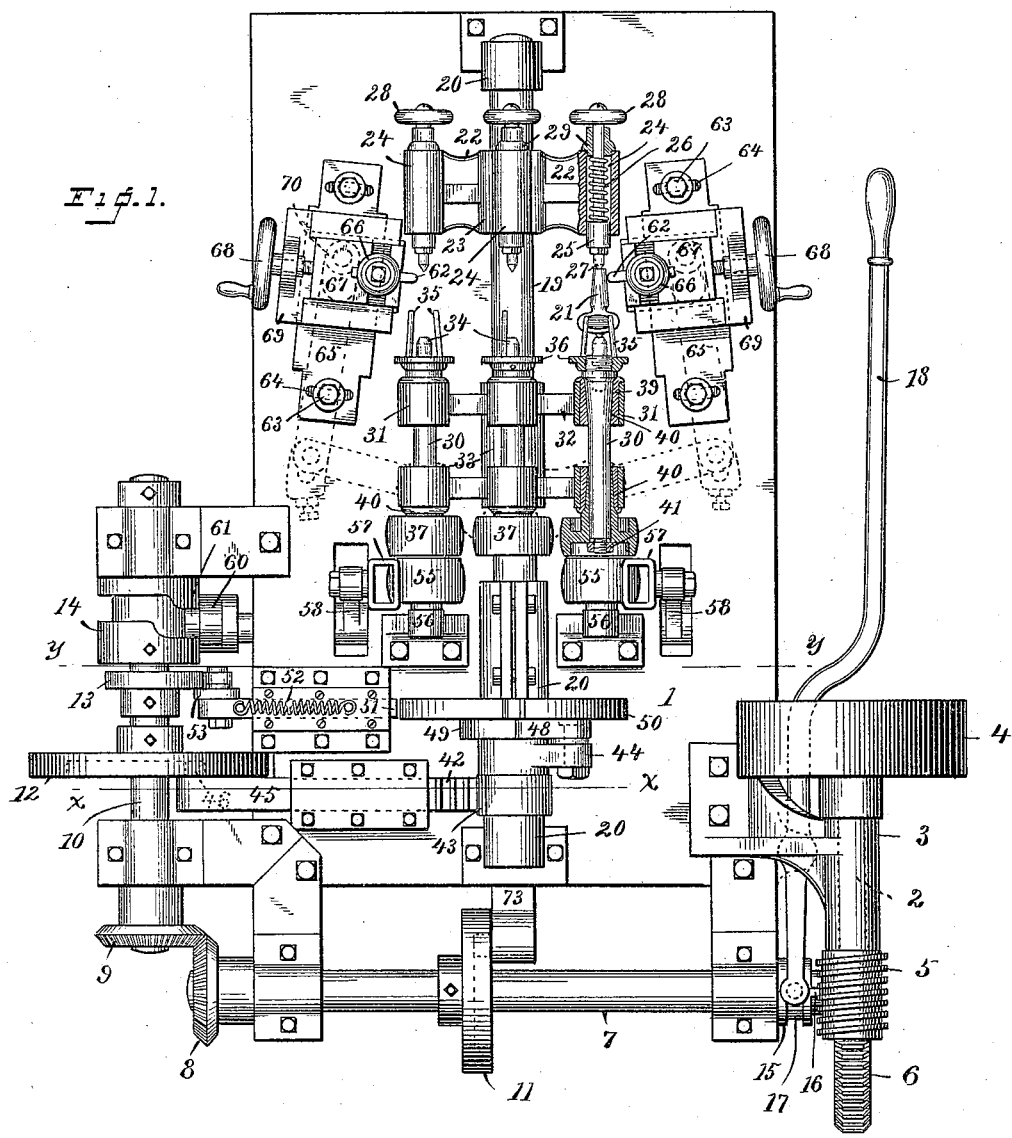
Figure 2:
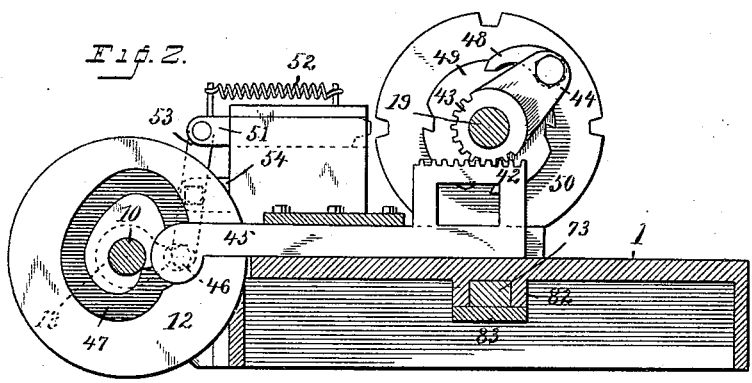
Figure 3:
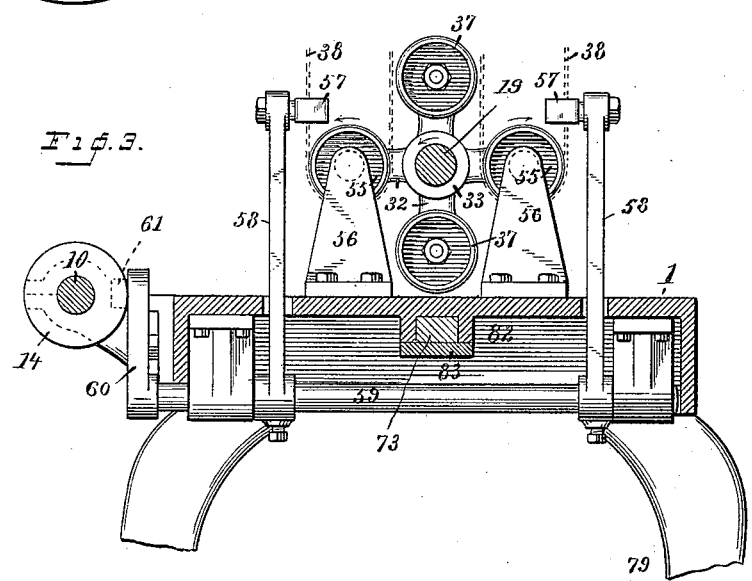
Figure 5:
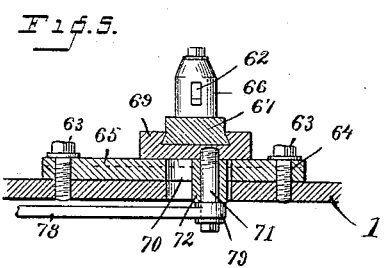
Figure 4:

Figure 1 is a plan view of the machine complete; Fig. 2, a section on the line $x\ x$; Fig. 3, a section on the line $y\ y$; Fig. 4, a detail view of mechanism for reciprocating the tool-carrier, and Fig. 5 is a detail sectional view of the tool-carrier.

In the drawings I have illustrated my novel machine as adjusted to turn keys for gas-cocks.

It should be understood, however, that the use of the machine is not limited to any special style of article, but that it may be readily adjusted to turn various articles, which may be either straight or tapering, within the limits of its capacity.

1 denotes the bed of the machine, and 2 a shaft mounted in a bracket 3 and provided with a belt-pulley 4, the belt by which power is applied not being shown.

5 is a worm on shaft 2, which engages a gear 6 on a transverse shaft 7. At the opposite end of shaft 7 is a bevel-pinion 8, which engages a corresponding pinion 9 on a longitudinal shaft 10, shafts 7 and 10 being mounted in brackets 3, all of which are secured to the bed. Shaft 7 is provided with a face-cam 11, and shaft 10 is provided with a face-cam 12, an edge-cam 13, and a grooved cam 14, from which the operative parts of the machine receive motion, as will presently be fully explained.

In the present machine the shaft 2 is constantly in motion, and the operative parts of the machine are stopped and started by means of a sliding collar 15, having a lug 16 adapted to engage a recess (not shown) in gear 6. The collar is provided with a peripheral groove 17, which is engaged by a pin on a pivoted operating-lever 18. In the position shown in Fig. 1 the parts are disconnected and the operative parts not in motion. An inward movement of the free end of lever 18 will move lug 16 into engagement with the recess in gear 6 and set the operative parts in motion.

19 denotes a shaft mounted in brackets 20 at the center of the machine. The keys or other articles to be turned (see 21 in Fig. 1) are carried by a series of head-stocks and tail-stocks mounted in radial arms 22, which are preferably cast integral with hubs 23, said hubs being rigidly secured to the shaft. In practice I use four head-stocks and a corresponding number of tail-stocks.

The construction of the tail-stocks is preferably substantially as follows: At the outer ends of the radial arms are sockets 24, within which are plungers 25, held at their forward position by springs 26. At the forward ends of the plungers are centers 27, which engage the tip of the key. The plunger is retracted in use by a hand-piece 28 at its inner end, the shank of which passes through a block 29, the block also serving as a stop to limit the forward movement of the plunger when not in use. 30 denotes the spindles of the head-stocks, which are mounted in bearings 31 at the outer ends of radial arms 32, extending from hubs 33, rigidly secured to the shaft. I preferably provide a bearing at each end of the spindles, as shown. At the forward end of each head-stock is a center 34, which in the present instance is provided with a socket to receive a knob on the handle of a gas-key. The spindle is also provided with a ring 36, from which two rods 35 extend at one side of the center, against which the side of the finger-piece of the key rests, as is clearly shown in Fig. 1. These rods, in connection with the centers, hold the key firmly, so that it must rotate with the spindle. At the rear ends of the spindles are belt-pulleys 37, adapted to receive belts 38. (See dotted lines, Fig. 3.) The spindles are preferably provided with inclines 39, and the bearings are provided with tapering bushings 40. A nut 41 at the rear end of the spindle acts, when tightened up, to draw the inclines into the bushings and take up lost motion. Intermittent rotary motion—i. e., a quarter-turn at each actuation—is imparted to shaft 19 by means of a sliding rack 42, which is engaged by a segment-gear 43 at the inner end of an arm 44. The rack is carried by a slide 45, which is provided with a roller 46, (see dotted lines, Fig. 2,) which engages a groove 47 in face-cam 12 on shaft 10. At the outer end of arm 44 is a pawl 48, which engages notches, four in number, in a disk 49, rigidly secured to shaft 19, the segment-gear of course turning on the arm each time the rack is moved in either direction.

In order that the shaft may at all times be under perfect control and may be locked rigidly at the completion of each quarter-revolution, I provide a disk 50, also having four notches, and a sliding latch 51, which is held in contact with the periphery of the disk by a spring 52, and which engages one of the notches, thereby locking the disk at the completion of each quarter-revolution. The latch is withdrawn from the notch an instant before the forward movement of the shaft commences by means of a lever 53, pivoted to a bracket 54, one end of the lever being pivoted to the latch and the other bearing against edge-cam 13 on shaft 10, this cam being provided with a suitable projection (see dotted lines, Fig. 2) which engages the lever at each revolution of the shaft and quickly withdraws the latch from the notch, the lever being almost instantly released, however, so that spring 52 will hold the latch in contact with the periphery of disk 50. Just back of belt-pulleys 37 on the head-stock spindles are belt-pulleys 55, carried by short shafts mounted in brackets 56, which are secured to the bed. Belts 38 pass through carriers 57, mounted in arms 58, which extend upward from a rock-shaft 59. At the outer end of the rock-shaft is an arm 60, provided with a roller 61, which engages the groove in cam 14 on shaft 10, the groove being so laid out as to oscillate the rock-shaft in each direction at each revolution of shaft 10, the action being to shift the belts from pulleys 55 to pulleys 37, thereby rotating the head-stocks and with them the keys or other articles that may be held. After the key or other article has been rotated for the required length of time, the return movement of the rock-shaft will oscillate arms 58 and shift the belt from pulleys 37 to pulleys 55 again, thereby stopping the rotation of the keys. The turning operation is performed by suitable tools 62, fixed in carriers on opposite sides of the machine. The carriers are adjustably secured to the machine by bolts 63, passing through curved slots 64 in the attaching-plates 65 of the carriers. This permits convenient adjustment of the carriers to cause the tools to act at any angle, so that the key or other article may be turned to any desired bevel, or straight-sided, if required. The shank of the tool is socketed in a head 66, rigidly secured to a transverse slide 67, which is adjusted by means of a hand-screw 68 in a slide 69, which carries the transverse slide and is itself adapted to reciprocate on attaching plate 65. The bed and the attaching-plate are provided with corresponding slots 70, through which pins 71 pass and engage slides 69. 72 (see Fig. 5) denotes bushings on the pins.

Reciprocatory movement is imparted to slides 69 by means of a slide 73, having rack-teeth on opposite sides thereof. This slide lies between ways 82 on the under side of the bed, and is held in position by a plate 83 rigidly secured to the ways. The slide is provided at its inner end with a roller (see dotted lines, Fig. 1) which engages a groove in the face of cam 11 on shaft 7. Both groove and pin are shown in dotted lines only. The rack-teeth upon the opposite sides of the slide are engaged by segmental gears 74 at the inner ends of levers 75. (See Fig. 4 and dotted lines in Fig. 1.) At the outer ends of these levers are cross-pieces 76, having curved slots 77.

78 denotes links having at one end hubs 79, through which pins 71 pass, and having at their other ends downwardly-extending pins 80, which lie in the curved slots and are engaged by set-screws 81 in the cross-pieces, so that lost motion may be readily taken up. The action of these parts is to move slides 69, the heads and the tools inward while the keys are in position to be acted upon, and then backward again, so that at the completion of the movement of the shaft carrying the stocks the tools will be in position to act on the next keys. In use the operator places the keys to be turned between the top head-stock and tail-stock in the manner already described. The next movement—i. e., quarter-revolution of the shaft and stocks—carries the first key to the turning-tool at the left, as seen in Fig. 1. The instant the movement is completed latch 51 engages a notch in disk 50 and locks the shaft and stocks in position for the key to be operated upon by the tool. At that instant the carriers begin to move inward—that is, toward the center of the machine—the amount of movement of the carriers being amply sufficient to give the required length of cut. At the instant the inward movement of the carrier and tool ceases the latch is withdrawn and the next movement of the shaft and stocks takes place. While the first key was being turned the operator has placed a second key between the next pair of stocks. The first cut is usually made by a roughing tool and the finishing of the key is made by a second tool on the opposite side of the machine. The second movement of the shaft and stocks carries the first key to the under side of the shaft, where no operation takes place, carries the second key to the first turning-tool, and while this operation is taking place the operator places the third key between the next pair of stocks. The third movement of the shaft and stocks carries the first key to the second tool where the turning is finished, carries the second key to the bottom, where no action takes place, and carries the third key to the first tool, where the roughing operation is performed. The fourth movement of the shaft and stocks carries the first key to the top, where it is removed, and a fifth key placed between the stocks. The second key is carried to the second turning-tool, the third key carried to the bottom, where no operation takes place, and the fourth key carried to the first turning-tool. It will be seen that shafts 7 and 10 make four complete revolutions while each key is in the stocks, and that after the stocks are filled a key is completed at each actuation of the machine ready to be removed, and another one being inserted in the place of each one removed, the operations proceed continuously.

Having thus described my invention, I claim—

1. Intermittently-rotating shaft 19 and series of head-stocks and tail-stocks carried thereby, in combination with suitable turning-tools, adjustable carriers therefor on opposite sides of the machine, and a slide having rack-teeth on opposite sides, segmental gears, and intermediate connections, whereby reciprocatory motion is imparted to the tool-carriers.

2. In a machine of the class described, a shaft carrying head-stocks and tail-stocks and having notched disks 49 and 50 and mechanism for imparting rotary movement to the head-stocks, in combination with an arm having a segmental gear and carrying a pawl engaging the notches in disk 49, a slide having rack-teeth engaging the segmental gear, a spring-latch adapted to engage the notches in disk 50, and mechanism, substantially as described and shown, for actuating the slide and retracting the latch.

3. The combination, with an intermittently-rotating shaft carrying head-stocks and tail-stocks, and means, substantially as described and shown, for rotating the head-stocks, of suitable turning-tools, adjustable carriers therefor, and a reciprocating slide having rack-teeth, segmental gears, and intermediate connections, whereby the slides are reciprocated.

In testimony whereof I affix my signature in presence of two witnesses.

FRANK B. MANVILLE.

Witnesses:
R. R. STANNARD,
F. A. TAYLOR.